Patented Jan. 23, 1951

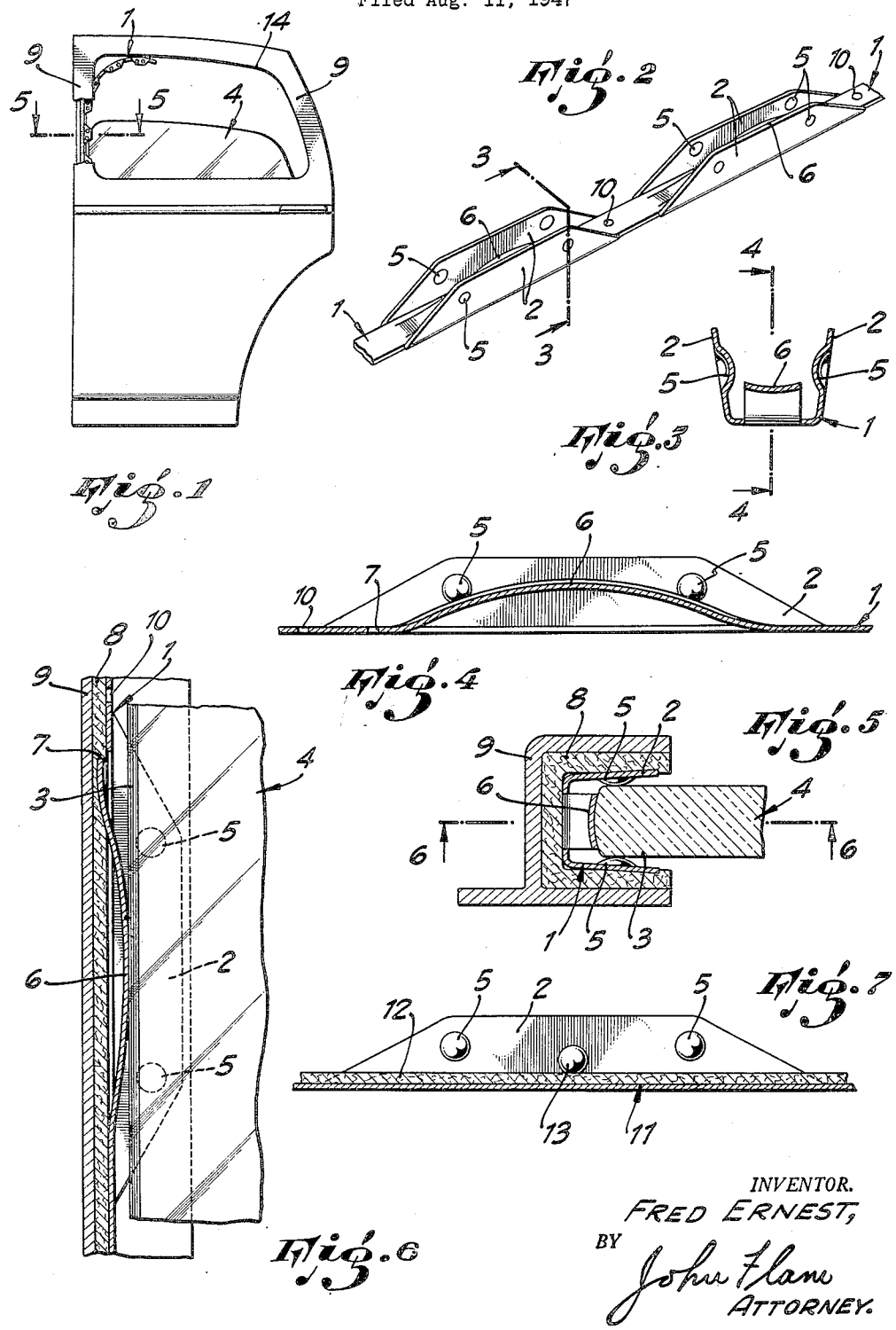

2,539,064

UNITED STATES PATENT OFFICE 2,539,064

WINDOW TIGHTENER

Fred Ernest, Gardena, Calif.

Application August 11, 1947, Serial No. 767,874

12 Claims. (Cl. 296—44.5)

This invention relates to devices adapted to prevent the rattling of slidable windows, and more particularly the windows on automobile doors.

In order to prevent the rattling of sliding windows in automobiles, felt is provided to form a groove or channel in which the edges of the window are accommodated. These felt liners become worn and matted down after continued use, and the window becomes loose and rattles within the frame. It is an object of this invention to provide a simple and inexpensive device to prevent the rattling of automobile door windows.

It has been common to provide devices for preventing slidable windows from rattling; but these devices are often mechanically complex, and the installation thereof generally entails considerable time and effort. Furthermore, a replacement of the felt liner itself requires that the automobile door and window be dismantled. It is accordingly another object of this invention to provide an improved form of a window securing apparatus in which it is unnecessary to disassemble any portion of the automobile.

It is still another object of this invention to provide a device for preventing the rattling of automobile door windows that is lightweight, easily installed, and adaptable to all forms of window designs.

It is still another object of this invention to provide a device for preventing the rattling of automobile door windows that can be economically manufactured, as by stamping, from standard material.

This invention possesses many other advantages, and has other objects which may be made more clearly apparent from a consideration of several embodiments of the invention. For this purpose there are shown a few forms in the drawings accompanying and forming part of the present specification. The forms will now be described in detail illustrating the general principles of the invention; but it is to be understood that this detailed description is not to be taken in a limiting sense, since the scope of this invention is best defined by the appended claims.

Referring to the drawings:

Figure 1 is a pictorial view of an automobile door and sliding window, showing an embodiment of the invention in the process of being installed on an automobile window structure;

Fig. 2 is a pictorial view of one form of the invention;

Fig. 3 is a sectional view, taken along the plane 3—3 of Fig. 2;

Fig. 4 is a sectional view, taken along the plane 4—4 of Fig. 3;

Fig. 5 is a sectional view showing that form of the invention shown in Fig. 2 in installed position; and this view is taken along the plane 5—5 of Fig. 1;

Fig. 6 is a sectional view, taken along the plane 6—6 of Fig. 5; and

Fig. 7 is a view, similar to Fig. 2, of a modified form of the invention.

The window tightener is shown as an elongated strip 1. This strip 1 is provided with flanges 2 extending longitudinally of the strip 1 in pairs, on opposite edges of the strip. These flanges 2 are formed integrally with the strip 1, and form a channel or groove into which the edge 3 of a window 4 is receivable.

Each of these flanges 2 is provided with a plurality of indentations 5 extending inwardly of the flanges 2. These indentations 5 contact the window 4 and restrict lateral movement thereof. In the form illustrated in Figs. 1–6, the strip 1 between the pairs of flanges 2 has a cantilever spring 6 formed integrally with the strip 1. The spring 6 extends longitudinally and is bowed in its unstressed condition; and the free end 7 of the spring 6 preferably extends below the strip 1. In order to conform to the rounded edges 3 of the window 4 which it is to engage, the spring 6 has a curved cross-section as illustrated in Figs. 3 and 5.

The strip 1 is made of thin, flexible material, such as stainless steel, bronze, or materials of similar properties. The material used is about 8 to 12 thousandths of an inch in thickness. Since the apparatus is an interrupted channel section, it can readily be flexed at the portions intermediate the pairs of flanges 2; and it can thus be readily installed between the sliding window 4 and the felt 8 of the permanent window frame 9 without dismantling any portion of the automobile structure. Furthermore, by this construction the apparatus can conform to many types of sliding window design.

With reference to Fig. 6, while the strip 1 is moved down with reference to the frame 9, the free end 7 of the spring 6 slides over the felt material 8; but, if the strip 1 is urged upwardly, then this free end 7 digs into the felt material 8 and restrains movement in this direction. Hence, in the process of insertion illustrated in Fig. 1, the spring 6 easily slides over the felt 8. During the use of a sliding window 4, the strip 1 can be moved only in that direction permitted by the alignment of the spring 6; and hence the strip 1 ultimately reaches the lowest position permitted by the depth of the door frame 9.

The flanges 2 are shown in Fig. 3 slightly diverging from one another; thus, the flanges 2, as shown in Fig. 5, resiliently engage the felt 8 by being confined to a substantially parallel arrangement thereby. The recesses 10 of the strip 1 are instrumental in transmitting the force necessary to insert the apparatus by accommodating a tool, such as a screw driver, or the like.

In the modification shown in Fig. 7, the strip 11 is similar to strip 1, but the spring 6 is omitted. Instead, a liner 12 of felt, cork, linoleum, metal, plastic, or the like, is provided to form a tight but yielding channel for the window 4. On each flange 2 is provided an indentation 13 in addition to the indentations 5; however, these indentations 13 are placed lower on the flange portion 2, and they confine the liner 12 against the strip 11.

In operative position, the device of either form prevents side movement and rattling of the sliding window 4. Sliding friction is greatly reduced by this device, and the window 4 cannot bind. The window 4 is contacted and supported against movement by the spring 6 or the liner 12, and also by the indentations 5 of the flanges 2. The strip 1 is of such length that the window 4 contacts at least a portion of the strip 1 or 11, regardless of the position of the window 4. Two strips of sufficient length can be inserted into the frame 9 at opposite sides of the windows to meet at the top 14 of the frame 9. In this manner the window 4 is in contact with the window tightener at the top and side edges when the window is closed.

The inventor claims:

1. In a device of the character described: an elongated strip; a series of pairs of resilient flanges at opposite longitudinal edges of the strip to form an interrupted channel configuration, between which the edge of a window is adapted to be received; there being lengths of the strip between the pairs of flanges to permit substantial flexing of the strip between pairs of flanges; and means on said strip to support a sliding window against extraneous movement.

2. In a device of the character described: an elongated strip having a series of spaced flanges on at least one edge of said strip; there being lengths of the strip between the spaced flanges to permit substantial flexing of the strip between said spaced flanges; and means on said strip to support a sliding window against extraneous movement.

3. In a device of the character described: an elongated metallic strip having a plurality of spaced pairs of resilient free flanges extending in spaced relation longitudinally of said strip; a spring formed between said flanges and from the material of said strip; and indentations in said flanges for reducing the effective spacing between said flanges; said strip between adjacent pairs of flanges being free of any flanges.

4. In a device adapted to be inserted between a sliding window and its frame: an elongated strip having a plurality of pairs of integrally formed flanges extending and spaced axially along the longitudinal edges of said strip, said flanges normally being slightly divergent from each other; said flanges having one or more inwardly directed indentations; there being one or more recesses in said strip for facilitating installation; a cantilever spring extending longitudinally of said strip between each of said pairs of flanges and formed integrally with said strip, leaving a recess therein; said spring being bowed to engage the edge of said window, and concave in its cross section to correspond substantially with the rounded edges of the window; and said spring upon compression having an end extending below the said strip.

5. In a device of the character described: an elongated metallic strip having a plurality of spaced pairs of free flanges extending longitudinally of said strip; an elongated window restraining member adapted to be inserted between the flanges of said strip and along the bottom of the channel formed by said flanges; and means for securing said member to said strip.

6. In a device adapted to be inserted between a sliding window and its frame: an elongated strip having a plurality of pairs of integrally formed resilient flanges extending and spaced axially along the longitudinal edges of said strip, said flanges normally being slightly divergent from each other; said flanges having one or more inwardly directed indentations; and there being one or more recesses in said strip for facilitating installation.

7. In a device adapted to be inserted between a sliding window and its frame: an elongated strip having a plurality of pairs of integrally formed flanges extending and spaced axially along the longitudinal edges of said strip, said flanges normally being slightly divergent from each other; said flanges having one or more inwardly directed indentations for reducing the effective distance between said flanges; a member carried by said strip; and inwardly directed indentations which confine said member to said strip.

8. In a device adapted to be inserted between a sliding window and its frame: an elongated strip having a plurality of spaced pairs of flanges extending longitudinally of said strip; and means adapted to restrain a sliding window against rattling including a spring fastened at the bottom of the channel defined by said flanges, said spring having a free end adapted to prevent movement of the device in one direction while permitting movement in the opposite direction.

9. In a device adapted to be inserted between a sliding window and its frame: an elongated strip having a plurality of pairs of integrally formed flanges extending and spaced axially along the longitudinal edges of said strip, said flanges normally being slightly divergent from each other; said flanges having one or more inwardly directed indentations; there being one or more recesses in said strip for facilitating installation; a liner on said strip; and means adapted to confine said liner against said strip.

10. In a device adapted to be inserted between a sliding window and its frame: an elongated strip; means carried by the strip for engaging a sliding window to restrain it against rattling; and leaf spring means carried by the strip for engaging the edge of the window; said leaf spring means having a free end extending through an opening in the strip to engage a portion of the frame.

11. In a device adapted to be inserted between a sliding window and its frame: an elongated strip having a plurality of pairs of integrally formed flanges extending and spaced axially along the longitudinal edges of said strip, said flanges normally being slightly divergent from each other; said flanges having one or more inwardly directed indentations; there being one or more recesses in said strip for facilitating installation; and means adapted to restrain said strip against movement in said frame while said strip is in operative position.

12. In a device of the character described: a continuous elongated strip; a series of pairs of flanges integrally attached only along the edges of the strip; each pair being disposed on opposite edges and spaced from the adjacent pair to define a length of strip between pairs that is free of any flanges; and means carried by the strip for restraining a window against rattling, said means extending between the opposite flanges.

FRED ERNEST.

REFERENCES CITED

The following references are of record in the file of this patent:

UNITED STATES PATENTS

| Number | Name | Date |
|---|---|---|
| 1,865,259 | Keller | June 28, 1932 |
| 1,908,864 | Reid | May 16, 1933 |
| 2,132,104 | Froeliger | Oct. 4, 1938 |
| 2,299,595 | Rydquist | Oct. 20, 1942 |
| 2,434,504 | Merrill | Jan. 13, 1948 |